United States Patent [19]

French

[11] Patent Number: 5,759,699

[45] Date of Patent: Jun. 2, 1998

[54] PROCESS FOR PRODUCTION OF LOW DIELECTRIC CERAMIC COMPOSITES

[75] Inventor: James E. French, Ballwin, Mo.

[73] Assignee: McDonnell Douglas Corporation, St. Louis, Mo.

[21] Appl. No.: 670,369

[22] Filed: Jun. 25, 1996

Related U.S. Application Data

[62] Division of Ser. No. 429,307, Apr. 26, 1995, abandoned.

[51] Int. Cl.$^6$ .......................................................... B32B 9/04
[52] U.S. Cl. ........................ 428/447; 427/226; 427/228; 427/255; 427/379; 427/387; 427/419.2; 427/419.7
[58] Field of Search ...................................... 427/226, 228, 427/255, 379, 387, 419.2, 419.7; 428/447

[56] References Cited

U.S. PATENT DOCUMENTS

| 5,133,993 | 7/1992 | Streckert et al. | 427/226 |
| 5,176,941 | 1/1993 | Peuckert et al. | 427/226 |
| 5,246,738 | 9/1993 | Blum | 427/387 |
| 5,358,739 | 10/1994 | Baney et al. | 427/226 |
| 5,552,466 | 9/1996 | Beckley et al. | 524/265 |

*Primary Examiner*—Helen Lee
*Attorney, Agent, or Firm*—Veo Peoples, Jr.; Peoples & Hale

[57] ABSTRACT

High strength fiber reinforced ceramic composites having low dielectric constants stable against high temperatures are made possible by post oxidation of 35–60 volume percent ceramic matrix enveloping 20–60 volume percent ceramic fiber.

2 Claims, 2 Drawing Sheets

PROCESS FOR PRODUCTION OF LOW DIELECTRIC CERAMIC COMPOSITES

This is a divisional of patent application Ser. No. 08/429,307, filed Apr. 26, 1995, now abandoned.

FIELD OF INVENTION

This invention relates generally to ceramic composites and more particularly to high strength fiber reinforced ceramic composites which have low dielectric constants and are capable of withstanding high temperatures.

DESCRIPTION OF THE BACKGROUND ART

Structural ceramic composite materials are utilized in a wide variety of high temperature and high strength applications for electrical and structural components. It is desirable in certain applications that a composite also possess a low dielectric constant. One such application involves the use of ceramic composites to form containers for use in microwave processing of materials. Microwaves are reflected to a lesser extent by materials having low dielectric constants and thus containers made of such materials allow more efficient microwave processing.

For large ceramic structures, it is advantageous to reinforce ceramics with fibers to make the ceramic less flaw-sensitive and thus more reliable. The reinforcement fibers act as load bearing constituent, restrain crack propagation in the matrix and when matrix strain is exceeded, give the part added strain capability. Thus, for large microwavable containers it is particularly advantageous to develop fiber reinforced ceramic composites which have low dielectric constants.

Various composite materials have been disclosed in the prior art which claim to provide high strength and high temperature stability. Among these materials are carbon/carbon composites, silicon carbide/silicon carbide composites as well as carbon fiber reinforced silicon carbide, and silicon carbide fiber reinforced carbon composites. However, none of these materials can provide a low dielectric constant material, especially at high temperatures where, for example, silicon carbide becomes increasingly conductive.

Ceramic composites have been made using dielectric fibers such as alumina fiber and dielectric ceramic matrices such as alumina or mullite, but such ceramic composites must be made using hot pressing or high temperature sintering processes.

The hot pressing process is severely limited in the size of the part that can be made. Large structures would require unduly expensive hot presses which would be impractical at the extreme manufacturing temperatures and pressures required.

Low dielectric ceramic composites can be made by the sintering of fiber reinforced composites produced using ceramic powder slurries or sol-gel techniques, but such composites contain large amounts of porosity (15%–30%) which so severely weakens matrix properties that the composite is not useful for microwave processing.

Ceramic composites have also been produced by the pyrolysis of silicon containing polymer composites. However, prior studies of this method have resulted in impure matrices which contain sufficient amounts of carbon to severely impact the low dielectric nature of such composites. J. R. Strife and J. P. Wesson, "A Study of the Critical Factors Controlling the Synthesis of Ceramic Composites from Preceramic Polymers", Dec. 15, 1990, R-90-917810-5, AD-A232-686.

SUMMARY OF THE INVENTION

It is, therefore, a principal object of the present invention to produce low porosity, low dielectric ceramic composites having high strength properties.

It is a further object of the present invention to provide a novel method for making such ceramic composites.

It is an additional object to provide low dielectric fiber reinforced composites capable of producing large microwavable containers.

DETAILED DESCRIPTION OF THE INVENTION

Figure 1:
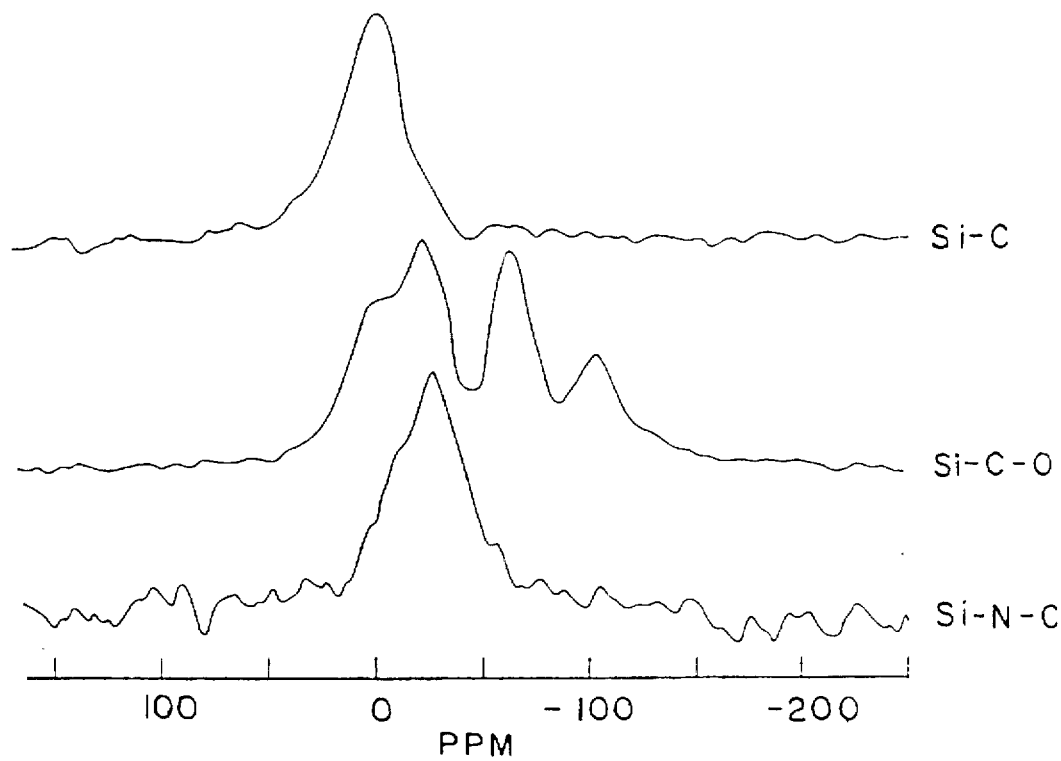

In accordance with the present invention, a ceramic composite is provided comprising 35–60 volume percent of a ceramic matrix derived from an amorphous polymer, 20–60 volume percent of a ceramic fiber reinforcement, and having less than 10% porosity. Such composites exhibit real dielectric constants below 5.0 with loss tangents below 0.01, and can withstand temperatures in excess of 2000 degrees fahrenheit. In addition, tensile strengths are in excess of 20,000 psi and interlaminar shear strengths are in excess of 2000 psi. The composites of the present invention are useful in any high temperature application wherein a low dielectric constant is required for best performance. They are particularly useful as microwave containers.

The ceramic matrix of the present invention generally comprise polymers formulated from silicon, oxygen, carbon and optionally nitrogen. The low dielectric properties of the present invention are achieved by producing the composite in accordance with a method which results in essentially none of the carbon being present as free elemental carbon. The amorphous polymer of the matrix may include, for example, various polysilazane or polysiloxane polymers and blends thereof. These are available from Huls-America, Ethyl Corp., Chisso Co. of Japan, and Allied Signal, which give ceramic yields in excess of 70%. The polymers must be fiber reinforced and pyrolyzed in inert atmosphere at temperatures below 2000° F. During pyrolysis, the original silicon or polysilazane polymer thermosets to form a network of amorphous ceramic, in which silicon is randomly bonded to either carbon, oxygen, or nitrogen. However, small amounts of elemental carbon are also formed, which cause high real dielectric constants in the ceramic material and high loss tangents.

Although amorphous ceramic, free of elemental carbon, can be produced by pyrolysis in gaseous ammonia, the use of gaseous ammonia is normally avoided. A more desirable method of producing low dielectric composites is to purify the pyrolyzed matrix by low temperature (temperatures as low as 700° F.–1300° F. can be used, while the upper temperature limit is dictated by thermal stability of other components such as the ceramic fiber), air oxidation after the inert atmosphere pyrolysis, to remove traces of elemental carbon from the matrix. We have found dielectric property measurements to be the most sensitive method to monitor the removal of low levels of carbon, which can have an extremely negative effect on dielectric properties. In fact, our dielectric property measurements show very large and unanticipated improvements through post oxidation of the initially produced ceramic composites. Specific conditions for this oxidation will depend upon other components in the system. In order to prevent deleterious effects upon components, such as boron nitride fiber coatings, the lowest temperature oxidation possible (i.e., $\geq 700°$ F.) is beneficial.

Fibers and particulate fillers are used in the present invention to reinforce the matrix and improve properties. The fibers can be continuous, discontinuous, or a combination of both types. Furthermore, the fibers' lengths, diameters, and aspect ratios can effect the properties of the composite material. In particular, if the fibers have less than a 50:1 aspect ratio, they are ineffective in toughening the matrix by a fiber pullout mechanism. In addition, fiber pullout effectiveness is increased by coating the fibers with a low modulus material. In the case of these low dielectric composites, a particularly preferred material for such fiber coating is boron nitride.

Fiber diameter can affect composite strength because smaller diameter fibers are generally stronger than large fibers. However, smaller diameter fibers, if producibile, can present greater problems in handling and in alignment. Therefore, the optimum composite strength depends on the trade-offs between such factors. Preferably, fibers have a length of at least 500 microns, fiber diameters of between 5 and 15 microns, and fiber aspect rations above 50:1. Properties such as composite strength, modulus, or density are often linearly dependent of fiber volume. The composite may comprise 20–60 volume percent of a ceramic fiber reinforcement, preferably 45–55 volume percent.

Alignment of fibers to be parallel to a uniaxial tensile load provides maximum composite strength. Trade-offs between fiber orientation and the degree of composite anisotropy desired will depend on application. Various fiber orientations can be used including unidirectional fiber prepreg, 2D cloth weaves, 3D woven structures, and random fiber orientation. Various materials may be used for the ceramic fiber reinforcement, provided the fibers have satisfactory strength and dielectric properties. The ceramic fiber reinforcement should have a room temperature dielectric constant of less than 6.5 at microwave frequencies, which frequencies are defined as 2–18 GHz. Examples of suitable fibers include boria-mullite fibers such as Nextel 312, 440 and 550 (3M), mullite-alumina fibers such as Altex (Sumitomo), high resistivity silicon oxycarbide fiber, such as Nicalon HVR (Nippon Carbon), and silicon-carbonitride fiber, such as HPZ (Dow Corning). Also suitable are silica fibers such as astroquartz (JPS) for lower temperature application. Discontinuous fibers such as chopped versions of the above or mullite fibers, such as Fiberfrax (Carborundum) can also be used. In the best mode of operation, these fibers should be coated with a low dielectric, low modulus ceramic. Boron nitride coatings, produced by chemical vapor deposition, are preferred.

Low dielectric oxide fillers such as silica-containing glass or ceramic can also reduce shrinkage during pyrolysis and thus are advantageous. Fillers such as particulate boron nitride, silicon nitride, and mullite can be advantageous to final properties, and can be applied to the reinforcing fibers during prepregging with liquid polymer or polymer solutions.

To obtain dielectric constants below 5.0 at low porosity, all components must have low real dielectric constants and loss tangents. In general, the rule of mixtures applies to the calculation of the dielectric constants of these composites. The key to effective utilization of specific combinations of fibers, fillers and polymers lies in the proper design and processing of the composite structure. To this end, there is provided examples of the method of the present invention, herein.

EXAMPLE 1

Chemical Composition of Pyrolyzed Polymers

Figure 2:
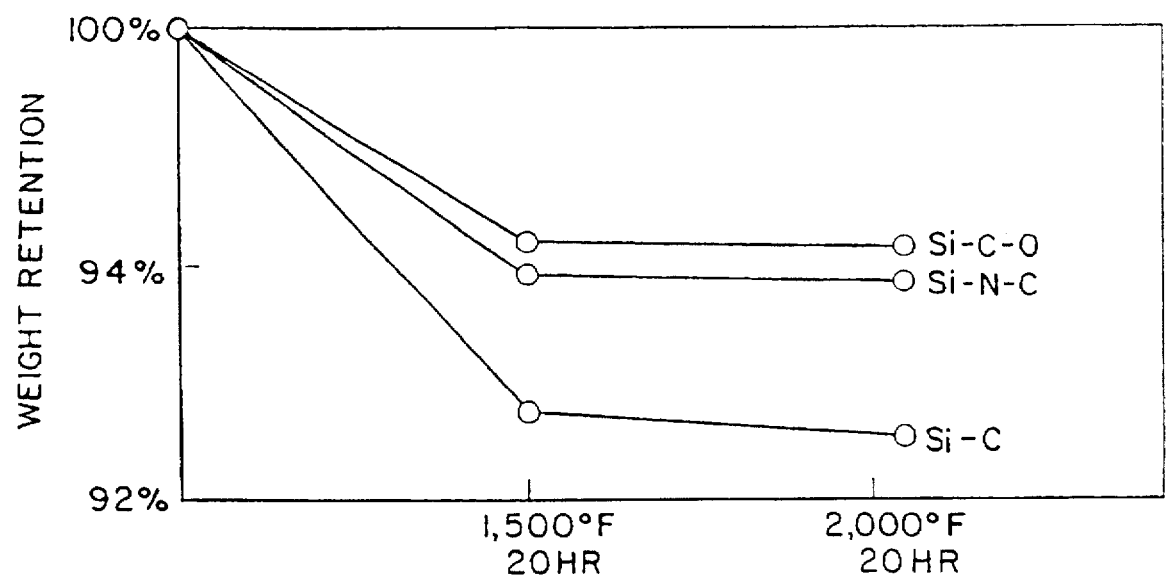

To define the composition of ceramic matrices suitable for this invention, polymers were pyrolyzed in argon and three determinations were run: 1) elemental analysis, 2) silicon-29 magic angle spectra NMR, and 3) weight loss studies. Three polymers were studied, a polysilazane polymer supplied by Chisso Company (NPC 200), a polysiloxane polymer supplied by Allied Signal (Black-glas 489C), and a polysilane polymer supplied by Union Carbide (Y12044). Elemental analyses are shown in Table 1 for polymers pyrolyzed to 1650° F. X-ray diffraction of these chars does not show crystalline phases so silicon NMR was run to determine whether oxygen, carbon, or nitrogen is attached to silicon. These spectra, shown in FIG. 1, verify that a statistical distribution of carbon, nitrogen and oxygen is bonded to silicon. This is especially evident for the silicon-oxycarbide ceramic where a collection of peaks is seen versus the two peaks that would be expected for a mixture of silicon carbide and silica. The presence of elemental carbon is difficult to quantitate by these methods. However, air oxidation of ceramic chars shows a weight loss that can be correlated by dielectric measurements with a carbon content of the chars. This weight loss shows the removal of elemental carbon by the formation of gaseous carbon oxides. In FIG. 2, we show such weight loss measurements for the chars produced in this example. It can be seen that simple argon pyrolysis produces chars that can contain considerable amounts of free carbon.

EXAMPLE 2

Figure 3:
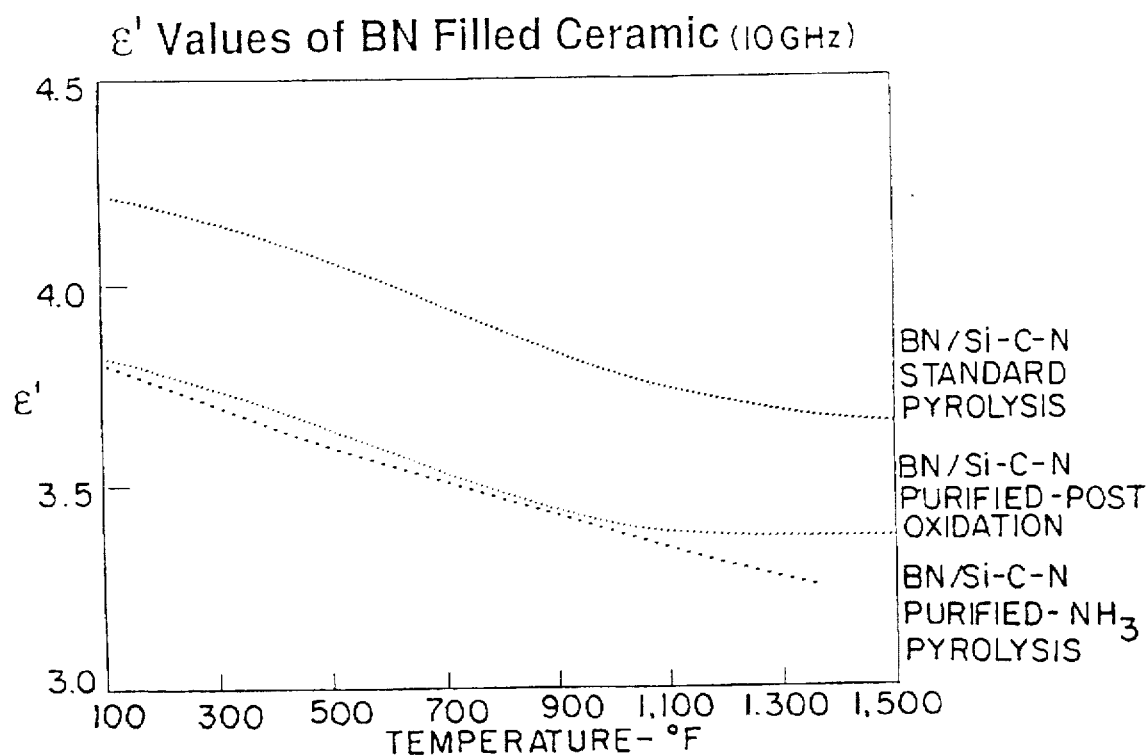

Synthesis and Dielectric Properties of BN Composites Using Different Pyrolysis Methods The dielectric properties of ceramic composites were determined by using argon pyrolysis and ammonia atmosphere pyrolysis of moldings produced from 50 weight percent boron nitride filled polymer moldings produced from polysilazane polymer. The dielectric properties of the ceramic produced by argon pyrolysis are considerably inferior to those produced by pyrolysis in an ammonia atmosphere, as can be seen in FIG. 3.

However, in an additional experiment, the argon pyrolyzed sample was oxidized in an air environment at 1000° F. As is shown in FIG. 3, the dielectric properties of the ceramic composite are dramatically improved from room temperature to 1500° F. The choice of 1000° F. oxidation temperature minimizes the oxidation of the boron nitride filler, yet effectively removes the elemental carbon from the ceramic to the point where dielectric properties are very similar to the composite pyrolyzed in ammonia atmosphere.

EXAMPLE 3

Figure 4:
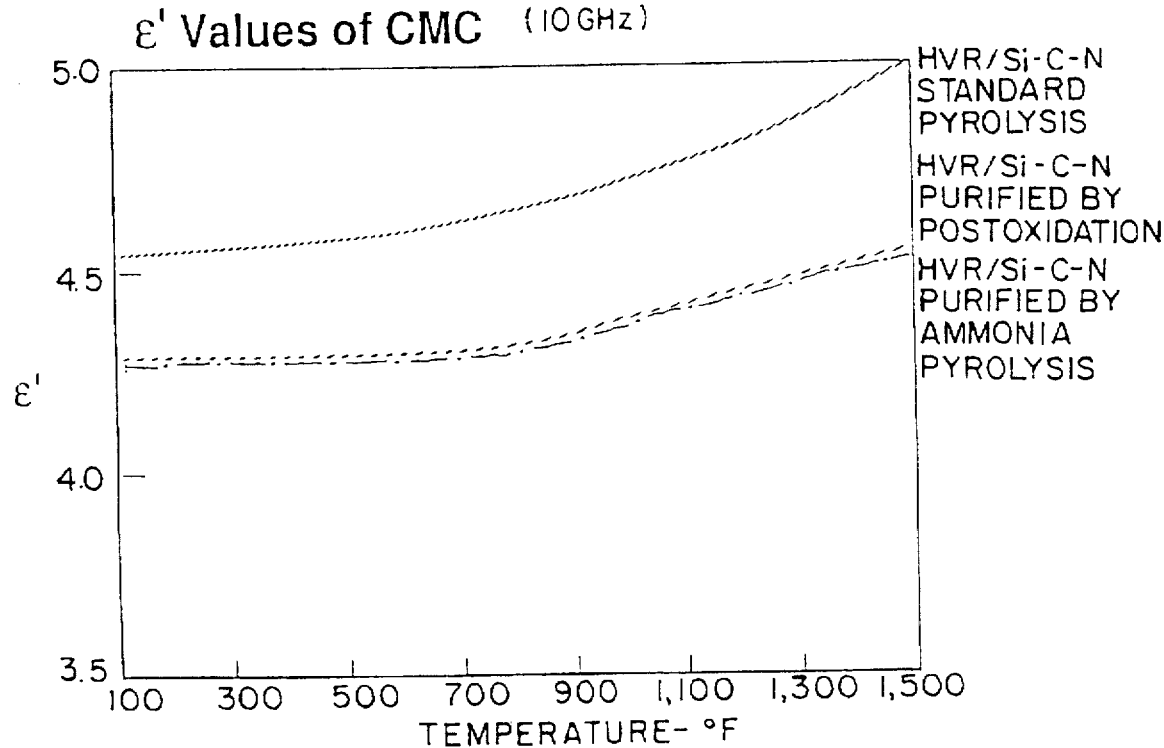

Preparation of Low Dielectric Fiber Reinforced Ceramics by Controlled Atmosphere Pyrolysis A one square meter piece of ceramic fiber cloth (Nicalon HVR-8 Harness Satin Weave) was treated with a toluene solution of Chisso NCP 200 polysilazane polymer and dried to form a prepreg cloth containing 50% by weight of polymer. The cloth prepreg was cut into 16 8 inch by 8 inch squares and stacked up into 2 8-ply 8×8 inch samples. Both samples were bagged in dammed stacks, wrapped with bleeder cloth and installed in a standard vacuum bag to be autoclave cured. While putting the bag under vacuum, the stacks were slowly cured in an autoclave to 400° F. under 100 psi of nitrogen pressure. One of the resulting polymer laminates was fired in a furnace using an argon atmosphere and a slow pyrolysis cycle to 1650° F. The second laminate was subjected to the same pyrolysis cycle in an ammonia atmosphere. The resulting laminates were re-impregnated with a 50% solution of the polymer in toluene, dried and fired in the same atmosphere in which they were originally pyrolyzed. The reimpregnation-pyrolysis process was repeated ten times to form two ceramic composites with specific gravities of approximately 2.1 g/cc. The argon pyrolyzed composite was then fired in an air atmosphere at 900° F. for 18 hours. Both the ammonia fired composite and the air purified composite were analyzed for dielectric properties by cutting 7 mm toroids and testing the toroids in a coaxial stripline cavity at room temperature to 1500° F. Results of the tests are shown in FIG. 4. Both composites had real dielectric constants of 4.0 at 10 GHz, with very low loss tangent.

Comparison Example

Preparation of a Fiber Reinforced Ceramic Without Controlled Atmosphere

Example 3 was repeated to form an 8-ply 8×8 inch ceramic composite that was pyrolyzed only in argon and was not subjected to any post pyrolysis purification. This composite was also machined into a 7 mm toroid and dielectric properties tested in a coaxial stripline cavity by the same procedures of Example 3. Results of this test are also shown in FIG. 4. This composite had a dielectric constant of 4.9 at 10 GHz and a high loss tangent, especially at frequencies below 10 GHz.

EXAMPLE 4

Production and Dielectric/Mechanical Properties of Filled CMC

Composites were prepared similarly to those in Example 3, using different combinations of polymers and ceramic fibers. Dielectric constant data, obtained from coaxial testing is summarized in Table 2. As can be seen, dielectric constant below 5.0 are obtained with all samples, and high strengths are obtained with BN-coated fibers.

TABLE 1

Compositions of Ceramic Chars Produced From Silicon Polymers

| | % Si | % C | % N | % O |
|---|---|---|---|---|
| Polysilazane (Si—N—C) | 55 | 14 | 28 | 1 |
| Polysiloxane (Si—C—O) | 42 | 20 | — | 38 |
| Polysilane (Si—C) | 55 | 42 | — | 3 |

TABLE 2

CMC Properties

| Ceramic | Fiber/Coating | Fiber (v/o) | UTS (kis) | $E^1$(10 GHz) |
|---|---|---|---|---|
| Si—N—C | Nicalon HVR/None | 40 | <10 | 4.5 |
| Si—O—C | Nicalon HVR/None | 40 | <10 | 4.4 |
| Si—O—C | Astroguartz/None | 40 | <10 | 3.5 |
| Si—N—C | Nicalon HVR/BN | 40 | 28 | 4.8 |
| Si—O—C | Nextel 550/BN | 28 | 23 | 4.3 |
| Si—O—C | Altex/BN | 30 | 25 | 4.9 |

What is claimed is:

1. A fiber reinforced ceramic composite with a real dielectric constant of <5.0 comprising 50–60 volume percent of an amorphous polymer matrix, free of elemental carbon and 20–60 volume percent of ceramic fibers coated with a low dielectric coating having a room temperature dielectric constant of less than 6.5, and a loss tangent of <0.01 when measured at 10 GHZ, a porosity of less than 10% and a tensile strength of greater than 20,000 psi.

2. A fiber reinforced ceramic composite as recited in claim 1 wherein the low dielectric coating is boron nitride.

* * * * *